(12) United States Patent
Wu et al.

(10) Patent No.: US 11,653,325 B2
(45) Date of Patent: May 16, 2023

(54) SIDELINK POSITIONING AND CHANNEL ACCESS FAILURE MANAGEMENT

(71) Applicant: QUALCOMM Incorporated, San Diego, CA (US)

(72) Inventors: Shuanshuan Wu, San Diego, CA (US); Dan Vassilovski, Del Mar, CA (US); Kapil Gulati, Belle Mead, NJ (US); Gabi Sarkis, San Diego, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 17/379,941

(22) Filed: Jul. 19, 2021

(65) Prior Publication Data

US 2023/0015310 A1  Jan. 19, 2023

(51) Int. Cl.
*H04W 92/18* (2009.01)
*H04W 64/00* (2009.01)
*H04L 5/00* (2006.01)
*H04W 24/08* (2009.01)

(52) U.S. Cl.
CPC ......... *H04W 64/006* (2013.01); *H04L 5/0051* (2013.01); *H04W 24/08* (2013.01); *H04W 92/18* (2013.01)

(58) Field of Classification Search
CPC ............... H04W 64/006; H04W 24/08; H04W 92/18; H04L 5/0051
See application file for complete search history.

(56) References Cited

U.S. PATENT DOCUMENTS

2019/0166451 A1* 5/2019 Mishra .............. H04W 72/0453

* cited by examiner

*Primary Examiner* — Said M Elnoubi
(74) *Attorney, Agent, or Firm* — Loza & Loza, LLP

(57) ABSTRACT

A wireless device can use a channel occupancy time (COT) to reserve a spectrum for sidelink positioning operations in a certain time interval. In some examples, multiple wireless devices can share the same COT for performing sidelink positioning and/or ranging operations using unlicensed or shared spectrum. Some aspects of the disclosure provide various processes for handling scenarios when channel access of the unlicensed spectrum is unsuccessful.

30 Claims, 10 Drawing Sheets

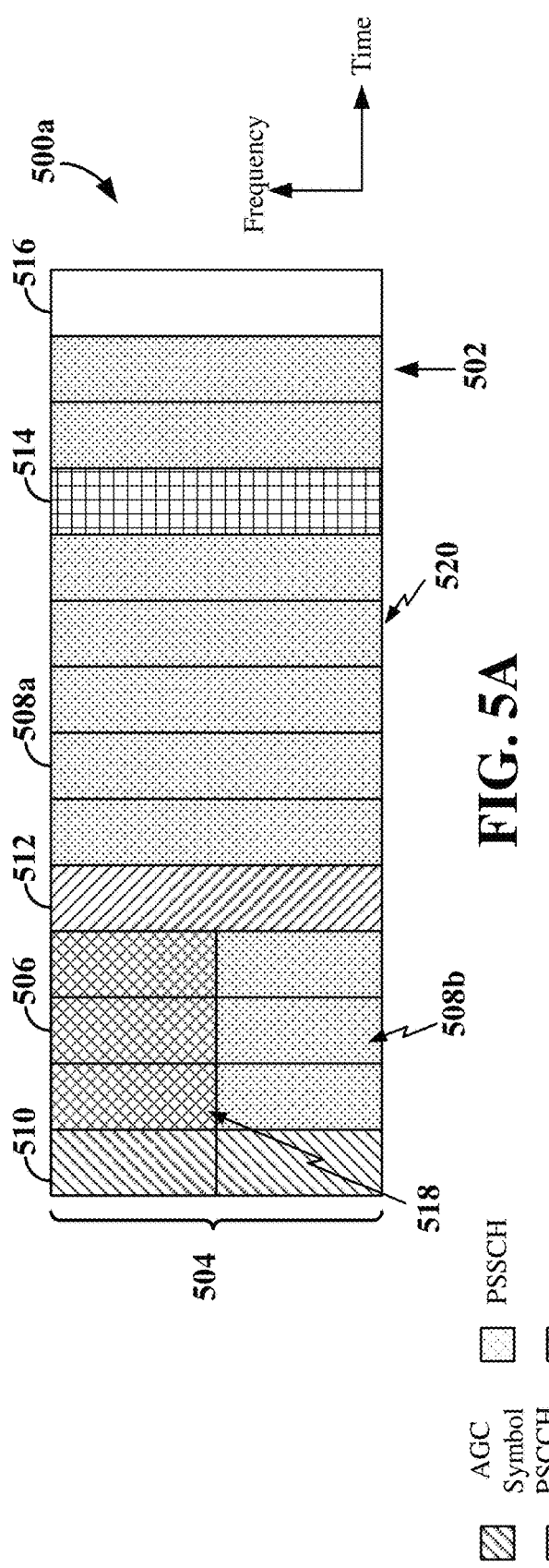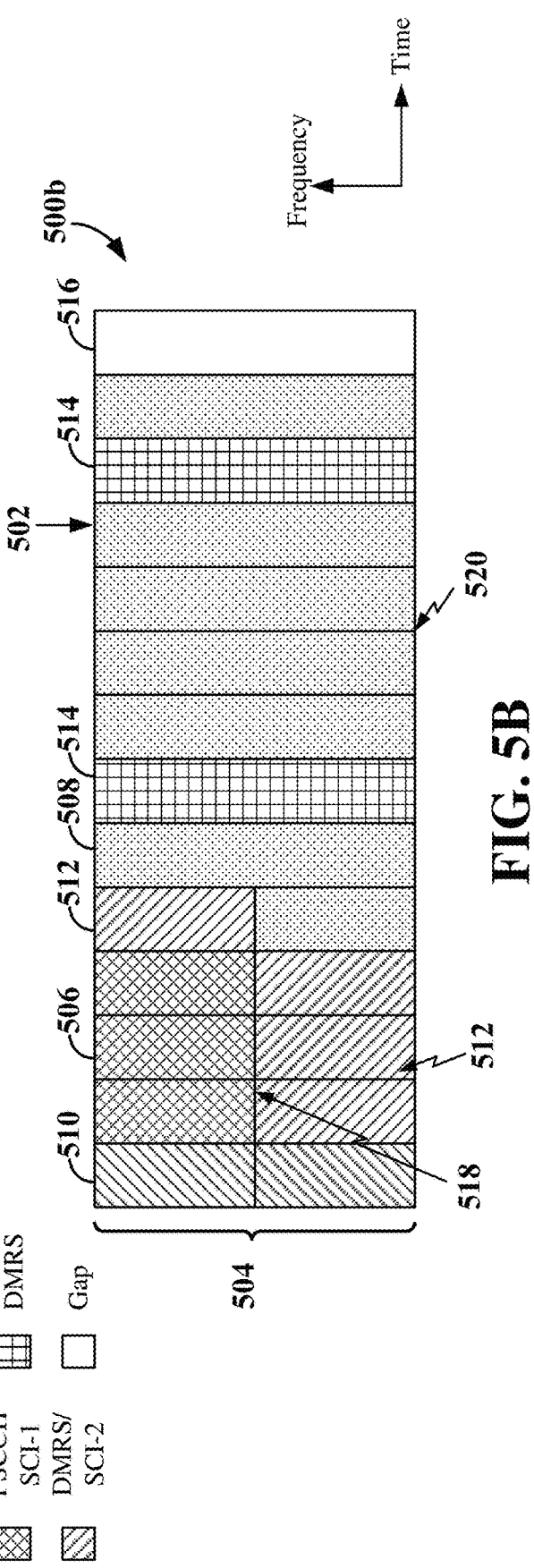

SIDELINK POSITIONING AND CHANNEL ACCESS FAILURE MANAGEMENT

TECHNICAL FIELD

The technology discussed below relates generally to wireless communication systems, and more particularly, to sidelink positioning and channel access failure management.

INTRODUCTION

Wireless communication devices, sometimes referred to as user equipment (UE), may communicate with a base station or may communicate directly with another wireless device (e.g., UE). When a UE communicates directly with another UE, the communication can be referred to as peer-to-peer (P2P), device-to-device (D2D), or sidelink communication. In sidelink communication, voice and data traffic from one UE may be transmitted to one or more other UEs without the communication signals passing through a base station of a telecommunication network.

In particular use cases, a UE may be a wireless communication device, such as a portable cellular device, or may be a vehicle, such as an automobile, a drone, or may be any other connected devices. When the UE is a vehicle, such as an automobile, the D2D or sidelink communication may be referred to as vehicle-to-everything (V2X) communication. Some examples of V2X communication include vehicle-to-infrastructure (V2I), vehicle-to-network (V2N), vehicle-to-pedestrian (V2P), and vehicle-to-vehicle (V2V). V2X communication, particularly V2V communication, can be used in various applications, for example, collision avoidance, autonomous driving, and positioning.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the disclosure provides a user equipment (UE) for wireless communication. The UE includes a transceiver configured for wireless communication, a memory, and a processor operatively coupled to the memory and the transceiver. The processor and the memory are configured to communicate with one or more sidelink devices to initiate a timer for performing a positioning operation between the UE and the one or more sidelink devices. The processor and the memory are further configured to monitor channel access of the positioning operation using the timer that is synchronized with respective timers at the one or more sidelink devices. The processor and the memory are further configured to transmit a message indicating a failure of the channel access based on an expiry of the timer.

Another aspect of the disclosure provides a method of wireless communication at a user equipment (UE). The method includes communicating with one or more sidelink devices to initiate a timer for performing a positioning operation between the UE and the one or more sidelink devices. The method further includes monitoring channel access of the positioning operation using the timer that is synchronized with respective timers at the one or more sidelink devices. The method further includes transmitting a message indicating a failure of the channel access based on an expiry of the timer.

Another aspect of the disclosure provides a user equipment (UE) for wireless communication. The UE includes means for communicating with one or more sidelink devices to initiate a timer for performing a positioning operation between the UE and the one or more sidelink devices. The UE further includes means for monitoring channel access of the positioning operation using the timer that is synchronized with respective timers at the one or more sidelink devices. The UE further includes means for transmitting a message indicating a failure of the channel access based on an expiry of the timer.

Another aspect of the disclosure provides a computer-readable storage medium stored with executable code for wireless communication. The executable code includes instructions for causing a user equipment (UE) to communicate with one or more sidelink devices to initiate a timer for performing a positioning operation between the UE and the one or more sidelink devices. The instructions further cause the UE to monitor channel access of the positioning operation using the timer that is synchronized with respective timers at the one or more sidelink devices. The instructions further cause the UE to transmit a message indicating a failure of the channel access based on an expiry of the timer.

These and other aspects of the invention will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain implementations and figures below, all examples can include one or more of the advantageous features discussed herein. In other words, while one or more implementations may be discussed as having certain advantageous features, one or more of such features may also be used in accordance with the various examples discussed herein. In similar fashion, while exemplary implementations may be discussed below as device, system, or method examples, it should be understood that such examples can be implemented in various devices, systems, and methods.

BRIEF DESCRIPTION OF THE DRAWINGS

FIGS. 5A and 5B are diagrams illustrating examples of sidelink slot structures according to some aspects of the disclosure.

DETAILED DESCRIPTION

Figure 1:
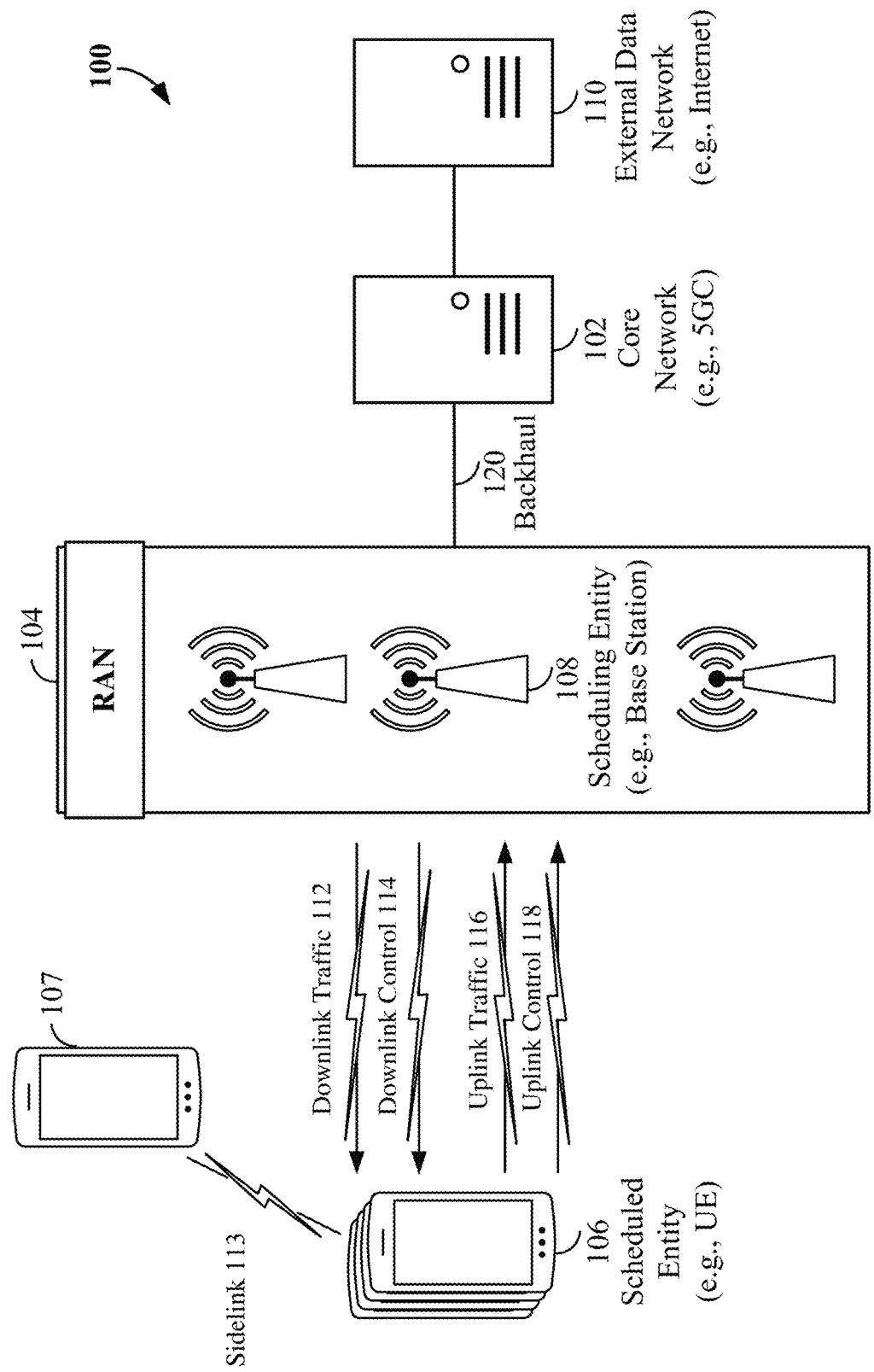
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the present disclosure are directed to positioning and ranging using sidelink communication. An example of sidelink communication is vehicle-to-everything (V2X) communication. In some aspects of the disclosure, wireless devices can perform positioning and/or ranging operations using unlicensed or shared spectrum. A wireless device can use a channel occupancy time (COT) to reserve a spectrum for sidelink positioning operations in a certain time interval.

In some examples, multiple wireless devices can share the same COT for performing sidelink positioning and/or ranging operations using unlicensed or shared spectrum. Some aspects of the disclosure provide various processes for handling scenarios when channel access of the unlicensed spectrum is unsuccessful.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106). In some aspects, transmissions between UEs (e.g., UE 106 and UE 107) may be referred to as sidelink traffic or transmissions 113 (e.g., V2X communication). In some examples, the UEs (e.g., UE 106 and UE 107) can perform sidelink position and/or ranging operation using unlicensed or shared spectrum.

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
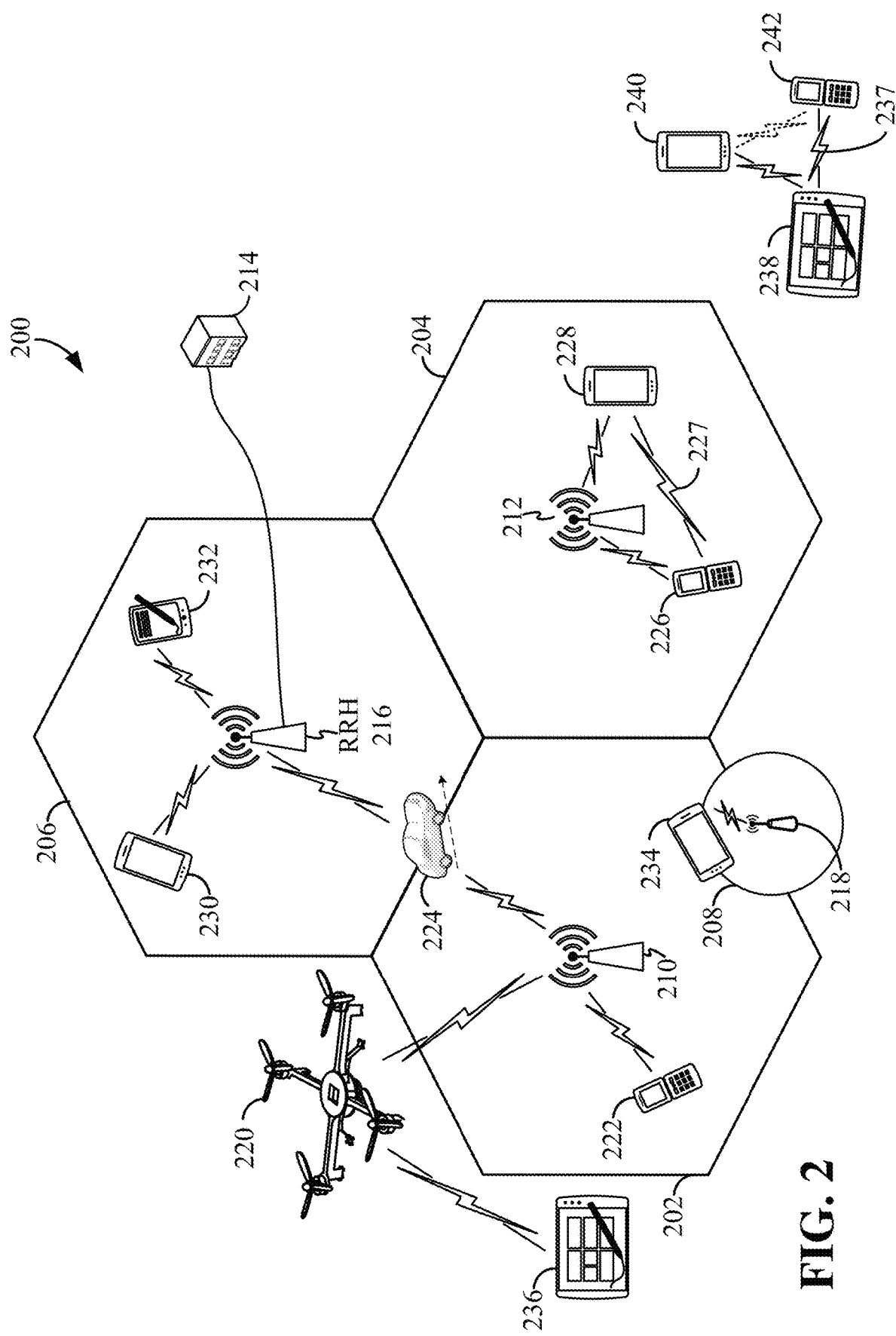
FIG. 2 is a conceptual illustration of an example of a radio access network according to some aspects of the disclosure.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 238, 240, and 242) may communicate with each other using peer-to-peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources (e.g., time, frequency, and spatial resources) to the UEs 226 and 228 for the sidelink communication and operations (e.g., positioning and ranging). In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) and a security anchor function (SEAF) that perform authentication. The SCMF can manage, in whole or in part, the security context for both the control plane and the user plane functionality.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may hand over the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for the exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Further, the air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (I-DMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In 5G New Radio (NR) specifications, user data may be coded in various manners. Some data can be coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel coding techniques. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
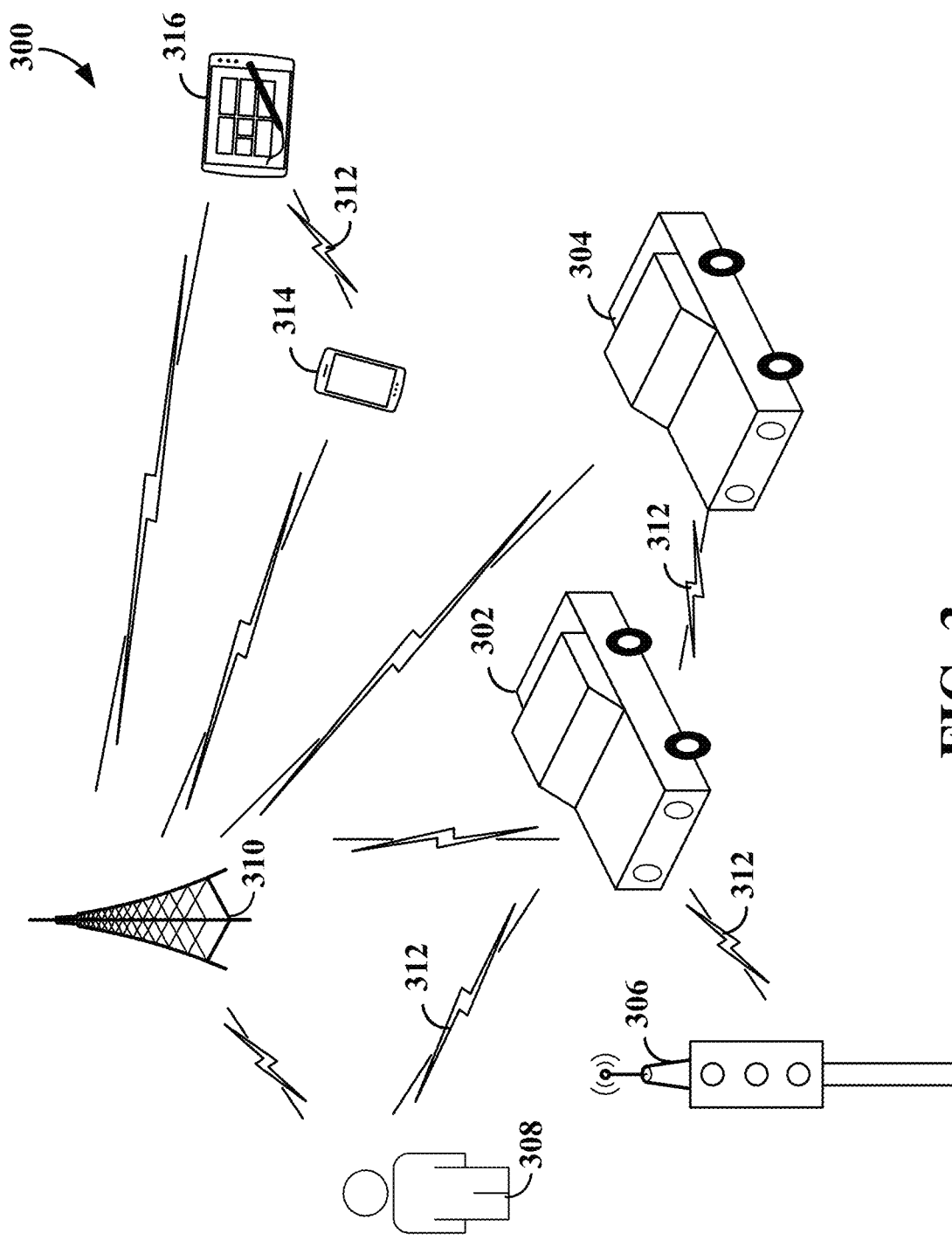
FIG. 3 is a conceptual illustration of an exemplary wireless network using sidelink communication according to some aspects of the disclosure.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data or signals may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases. Examples of other proximity use cases may include public safety or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., V-UEs 302 and 304 and P-UE 308) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., UEs 314 and 316) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 4:
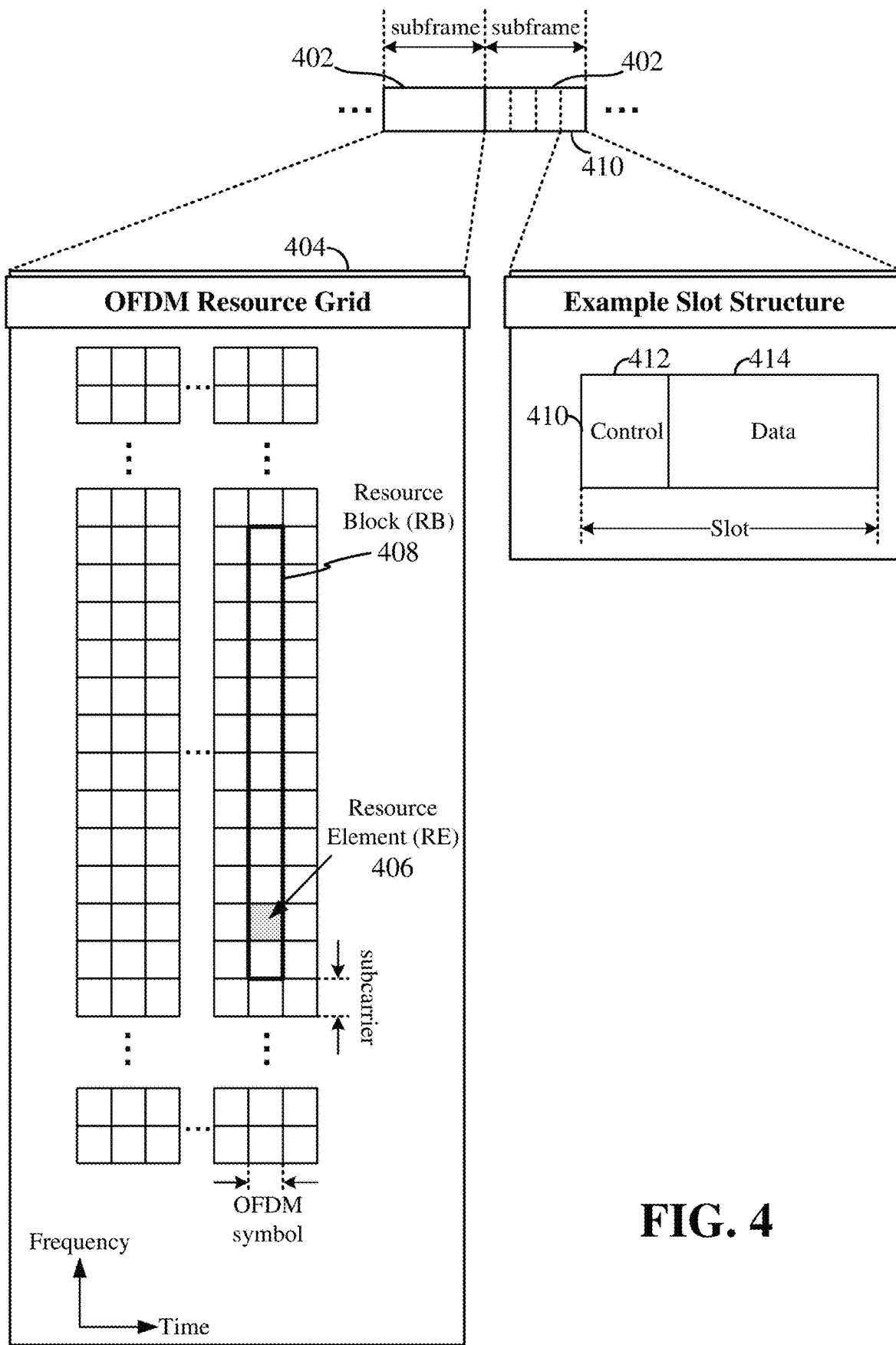
FIG. 4 is a schematic illustration of an organization of wireless resources in an air interface utilizing orthogonal frequency divisional multiplexing (OFDM) according to some aspects of the disclosure.

Referring now to FIG. 4, an expanded view of an exemplary subframe 402 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a proximity service (ProSe) PC5 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 4 are not necessarily all of the channels or carriers that may be utilized between devices, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. For example, the base station 310 may schedule the sidelink communication via DCI (e.g., DCI 3_0). In some examples, the base station 310 may schedule the PSCCH/PSSCH within uplink resources indicated in DCI 3_0. The base station 310 may further activate preconfigured sidelink grants (e.g., configured grants) for sidelink communication among the sidelink devices. In some examples, the base station 310 may activate a configured grant (CG) via RRC signaling. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). For example, SCI-1 may include a physical sidelink shared channel (PSSCH) resource assignment and a resource reservation period (if enabled). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may be transmitted on the PSSCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK (e.g., for groupcast option 1 supporting NACK-only signaling). SCI-2 may include other information that is useful for establishing and decoding a PSSCH resource.

FIGS. 5A and 5B are diagrams illustrating examples of sidelink slot structures according to some aspects. The sidelink slot structures may be utilized, for example, in a V2X or other D2D network implementing sidelink. In the examples shown in FIGS. 5A and 5B, time is in the horizontal direction with units of symbols 502 (e.g., OFDM symbols); and frequency is in the vertical direction. Here, a carrier bandwidth 504 allocated for sidelink wireless communication is illustrated along the frequency axis. The carrier bandwidth 504 may include a plurality of sub-channels, where each sub-channel may include a configurable number of PRBs (e.g., 10, 14, 20, 24, 40, 44, or 100 PRBs).

Each of FIGS. 5A and 5B illustrate an example of a respective slot 500a or 500b including fourteen symbols 502 that may be used for sidelink communication. However, it should be understood that sidelink communication can be configured to occupy fewer than fourteen symbols in a slot 500a or 500b, and the disclosure is not limited to any particular number of symbols 502. Each sidelink slot 500a and 500b includes a physical sidelink control channel (PSCCH) 506 occupying a control region 518 of the slot 500a and 500b and a physical sidelink shared channel (PSSCH) 508 occupying a data region 520 of the slot 500a and 500b. The PSCCH 506 and PSSCH 508 are each transmitted on one or more symbols 502 of the slot 500a and 500b. The PSCCH 506 includes, for example, SCI-1 that schedules transmission of data traffic on time-frequency resources of the corresponding PSSCH 508. As shown in FIGS. 5A and 5B, the PSCCH 506 and corresponding PSSCH 508 are transmitted in the same slot 500a and 500b. In other examples, the PSCCH 506 may schedule a PSSCH in a subsequent slot.

In some examples, the PSCCH 506 duration is configured to be two or three symbols. In addition, the PSCCH 506 may be configured to span a configurable number of PRBs, limited to a single sub-channel. The PSSCH resource size may be fixed for a resource pool (e.g., 10% to 100% of one sub-channel in the first two or three symbols). For example, the PSCCH 506 may occupy 10, 12, 15, 20, or 25 RBs of a single sub-channel A DMRS may further be present in every PSCCH symbol. In some examples, the DMRS may be placed on every fourth RE of the PSCCH 506. A frequency domain orthogonal cover code (FD-OCC) may further be applied to the PSCCH DMRS to reduce the impact of colliding PSCCH transmissions on the sidelink channel. For example, a transmitting UE may randomly select the FD-OCC from a set of pre-defined FD-OCCs. In each of the examples shown in FIGS. 5A and 5B, the starting symbol for the PSCCH 506 is the second symbol of the corresponding slot 500a or 500b and the PSCCH 506 spans three symbols 502.

The PSSCH 508 may be time-division multiplexed (TDMed) with the PSCCH 506 and/or frequency-division multiplexed (FDMed) with the PSCCH 506. In the example shown in FIG. 5A, the PSSCH 508 includes a first portion 508a that is TDMed with the PSCCH 506 and a second portion 508b that is FDMed with the PSCCH 506. In the example shown in FIG. 5B, the PSSCH 508 is TDMed with the PSCCH 506.

One and two layer transmissions of the PSSCH 508 may be supported with various modulation orders (e.g., QPSK, 16-QAM, 64-QAM and 256-QAM). In addition, the PSSCH 508 may include DMRSs 514 configured in a two, three, or four symbol DMRS pattern. For example, slot 500a shown in FIG. 5A illustrates a two symbol DMRS pattern, while slot 500b shown in FIG. 5B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 508 symbols in the slot 500a or 500b. In addition, a gap symbol 516 is present after the PSSCH 508 in each slot 500a and 500b.

Each slot 500a and 500b further includes SCI-2 512 mapped to contiguous RBs in the PSSCH 508 starting from the first symbol containing a PSSCH DMRS. In the example shown in FIG. 5A, the first symbol containing a PSSCH DMRS is the fifth symbol occurring immediately after the last symbol carrying the PSCCH 506. Therefore, the SCI-2 512 is mapped to RBs within the fifth symbol. In the example shown in FIG. 5B, the first symbol containing a PSSCH DMRS is the second symbol, which also includes the PSCCH 506. In addition, the SCI-2/PSSCH DMRS 512 are shown spanning symbols two through five. As a result, the SCI-2/PSSCH DMRS 512 may be FDMed with the PSCCH 506 in symbols two through four and TDMed with the PSCCH 506 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 506 may be blind decoded at the receiving wireless communication device. However, since the format, starting location, and number of REs of the SCI-2 512 may be derived from the SCI-1, blind decoding of SCI-2 is not needed at the receiver (receiving UE).

In each of FIGS. 5A and 5B, the second symbol of each slot 500a and 500b is copied onto (repeated on) a first symbol 510 thereof for automatic gain control (AGC) settling. For example, in FIG. 5A, the second symbol containing the PSCCH 506 FDMed with the PSSCH 508b may be transmitted on both the first symbol and the second symbol. In the example shown in FIG. 5B, the second symbol containing the PSCCH 506 FDMed with the SCI-2/PSSCH DMRS 512 may be transmitted on both the first symbol and the second symbol.

Within a sidelink communication network, such as a V2X network, positioning of UEs may enhance or support various features, such as navigation, autonomous driving, and cooperative safety. Positioning of UEs may be accomplished, for example, using a global navigation satellite system (GNSS) receiver within the UE and/or via sidelink-based ranging and/or positioning between UEs. For example, UEs may exchange positioning reference signals (PRSs) over sidelinks to determine the relative distance between the UEs and/or the absolute position (e.g., geographical coordinates) of the UEs. Sidelink-based positioning may enhance the range and position accuracy of GNSS-based positioning or may be utilized in situations where GNSS is degraded or unavailable. In some aspects, UEs can transmit PRSs using shared or unlicensed spectrum.

In some examples, sidelink-based positioning may involve a three-way handshake for session establishment, followed by the exchange of PRSs and concluded with the exchange of positioning information obtained based on the PRSs that is indicative of the relative and/or absolute position of one or more of the UEs. A sidelink positioning session may be triggered by a UE transmitting a request to establish the sidelink positioning session to one or more other UEs in the vicinity of the transmitting UE. In general, the larger the bandwidth of the PRS, the higher the accuracy of positioning can be achieved. For example, for sub-meter level accuracy, the PRS bandwidth needs to be 100 MHz or larger. However, licensed sidelink spectrum (e.g., Intelligent Transport Systems (ITS) band) may not provide sufficient bandwidth.

Various aspects of the disclosure disclose techniques for tracking channel access of spectrum (e.g., unlicensed or shared spectrum) used in sidelink positioning and/or ranging. In some examples, sidelink devices (e.g., V2X devices, UEs, scheduled entities) can use a channel access procedure to sense the spectrum before using the spectrum for transmitting a reference signal (e.g., PRS, CSI-RS, SRS, etc.) for positioning. In some aspects, the spectrum may be an unlicensed or shared spectrum. However, using unlicensed spectrum for sidelink positioning can introduce uncertainty because the channel access procedure may not be successful each time. In some examples, a sidelink device can use a timer to track and monitor the channel access process (e.g., listen-before-talk (LBT)) when unlicensed/shared spectrum is used for sidelink positioning.

Sidelink Positioning Session

Figure 6:
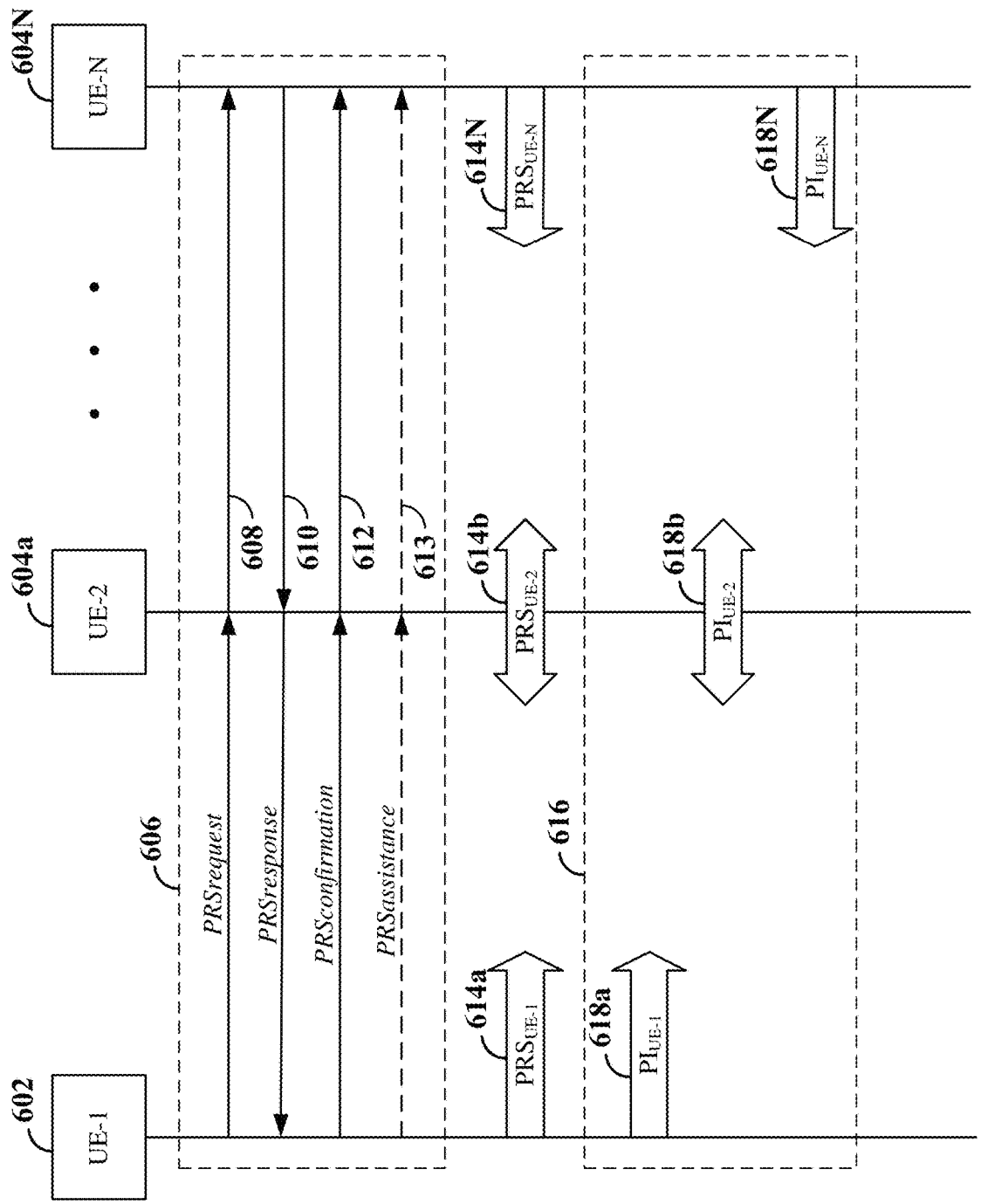
FIG. 6 is a signaling diagram illustrating exemplary sidelink signaling between wireless communication devices according to some aspects of the disclosure.

FIG. 6 is a signaling diagram illustrating exemplary sidelink signaling between wireless communication devices in a sidelink positioning session according to some aspects. Each of the wireless communication devices (e.g., UE 602 and 604*a* . . . 604N) may be any of the UEs, sidelink (e.g., V2X, D2D, etc.) devices, or other scheduled entities shown in FIGS. 1, 2, and/or 3.

At 606, a sidelink positioning session may be established using a three-way messaging handshake technique. For example, at 608, a first (initiating) UE 602 (e.g., UE-1) may transmit a sidelink positioning session establishment message (PRSrequest) to one or more second (target) UEs (e.g., responding UE-2 604*a* UE-N 604N). In some examples, the initiating UE 602 can be called an initiator UE, and the target UE can be called a responder UE. The PRSrequest may be unicast to a single target UE (e.g., UE-2 604*a*) or multiple UEs (e.g., UEs 604*a* . . . 604N) or groupcast or broadcast to multiple UEs (e.g., UEs 604*a* . . . 604N). In some examples, the PRSrequest may be transmitted over a portion of the resources allocated to a PSSCH (e.g., as shown in FIGS. 5A and 5B). In this example, the remaining resources allocated to the PSSCH that are not used by the PRSrequest may be unused (e.g., no PSSCH data may be transmitted on the remaining resources). In other examples, the PRSrequest may be transmitted within all of the resources allocated to the PSSCH.

In some aspects, the first UE 602 can transmit the PRSrequest using sidelink control information (e.g., SCI-1 and/or SCI-2). In some aspects, the first UE 602 can transmit the PRSrequest using higher layer signaling, for example, MAC CE or RRC signaling. In one example, the SCI-1 may include a PSSCH resource assignment that is allocated only to SCI-2 when it includes PRSrequest. In some examples, the SCI-2 may include an SCI-2 format for sidelink positioning establishment. In addition, the SCI-1 may further indicate that the SCI-2 format is the SCI-2 sidelink positioning establishment format. For example, the SCI-2 format included in the SCI-1 may be a dedicated SCI-2 sidelink positioning establishment format. As another example, the SCI-1 may include a sidelink positioning indicator (e.g., a single bit, which may be, for example, one of the reserved bits in SCI-1) to indicate that the SCI-2 format is the sidelink positioning establishment format. In this example, a receiving UE (e.g., target UE 604*a* . . . 604N) may ignore the SCI-2 format included in the SCI-1 and instead process the SCI-2 based on the SCI-2 sidelink positioning establishment format.

In response to receiving the sidelink positioning establishment message, at 610, each of the target UEs (e.g., UE-2 604*a* UE-N 604N) may transmit a sidelink positioning session response message (PRSresponse) to the initiating UE-1 602 to join the sidelink positioning session or positioning group. Then, at 612, the initiating UE-1 602 may transmit a sidelink positioning session confirmation message (PRSconfirmation) to the target UEs 604*a* . . . 604N to confirm the establishment of the sidelink positioning session. In some aspects, the PRSrequest, PRSresponse, and/or PRSconfirmation message may include sidelink positioning-related configuration information, for example, PRS configuration. In some aspects, the initiating UE-1 can transmit positioning-related configuration information in a separate positioning assistance message 613 (PRSassistance) before and/or after PRS transmission. In some aspects, the UEs can perform the above-described sidelink positioning session using sidelink communication in a sidelink spectrum (e.g., licensed bands) that is different from the spectrum (e.g., unlicensed bands) used for PRS transmission.

At 614, each of the initiating UE 602 and target UEs 604*a* . . . 604N may transmit a respective PRS. For example, at 614*a*, UE-1 602 may transmit a PRS (PRS$_{UE-1}$), and at 614*b* . . . 614N, each of the target UEs UE-2 604*a* UE-N 604N may transmit a respective PRS (PRS$_{UE-2}$ . . . PRS$_{UE-N}$). The PRSs may be transmitted, for example, in accordance with PRS resources indicated in the sidelink positioning session establishment message. In some examples, the PRSs may be wideband PRSs transmitted across a particular frequency band or sub-band. In some examples, the PRS resources may include unlicensed spectrum, for example, UN-II 3 or UN-II 5.

At 616, each of UE-1 602 and UE-2 604*a* UE-N 604*b* may exchange positioning information (PI) obtained based on the PRSs. For example, at 618*a*, UE-1 502 may transmit positioning information (PI$_{UE-1}$) 618 obtained by UE-1 based on the received PRSs from the target UEs 604*a* . . . 604N. Similarly, at 618*b* . . . 618N, each of UE-2 604*a* UE-N 604N may transmit respective PI (e.g., PI$_{UE-2}$ . . . PI$_{UE-N}$) to the initiating UE 602 and each other UE (e.g., UE-2 604*a* . . . 604N) that joined the sidelink positioning session. In some examples, the PI (e.g., PI$_{UE-1}$ . . . PI$_{UE-N}$) may also be transmitted within respective SCI-2 by each of the UEs 602 and 604*a* . . . 604N.

For example, UE-2 604*a* may calculate an inter-UE round-trip-time (RTT) between UE-1 602 and UE-2 604*a* based on the transmit and receive times of PRS$_{UE-1}$. The UE-2 604*a* may further calculate the RTT between UE-2 604*a* and each of the other participating UEs (e.g., UE-N 604N) based on the transmit and receive times of the corresponding respective PRSs (e.g., PRS$_{UE-N}$). The UE-2 604*a* may then include the RTT calculated for UE-1 602 and all other UEs (e.g., UE-N 604N) in the PI$_{UE-2}$ and transmit the PI$_{UE-2}$ to all participating UEs (e.g., UE-1 602 . . . UE-N 604N). The UE-2 604*a* may further include a location (e.g., geographical coordinates) of UE-2 504*a* in PI$_{UE-2}$, if known. In some examples, each UE can determine the time of arrival (ToA), time difference of arrivals (TDOA), angle of arrival (AoA), round trip time (RTT), etc., based one or more PRSs received from other UEs.

Based on the PI$_{UE-2}$ received from UE-2 604*a*, UE-1 602 may discern its relative position or absolute position (e.g., geographical coordinates). In examples in which UE-1 602 has zero or inaccurate knowledge of its position, the $PI_{UE-2}$ may be utilized by UE-1 602 to yield an inter-UE range between UE-1 602 and UE-2 604a. In examples in which UE-1 602 has accurate knowledge of its position (e.g., based on a GNSS-based positioning or receipt of multiple PI (e.g., $PI_{UE-2}$ ... $PI_{UE-N}$) from multiple UEs), the $PI_{UE-2}$ (e.g., together with other PI received during the sidelink positioning session) may be utilized by UE-1 602 to yield an absolute position of UE-1 602. Similarly, each target UE 604a ... 604N may further utilize each PI (e.g., $PI_{UE-1}$ ... $PI_{UE-N}$) received during the sidelink positioning session to discern their relative and/or absolute position.

In some aspects, sidelink devices (e.g., UE-1, UE-2 ... UE-N) can establish the sidelink positioning session using licensed spectrum for the handshaking between the UEs and transmit their respective PRSs (e.g., $PRS_{UE-N}$) using unlicensed or shared spectrum (e.g., U-NII 3 or 5, NR-U spectrum). Because unlicensed or shared spectrum may be shared with other wireless technologies (e.g., Wi-Fi, Bluetooth, etc.) and/or subject to more interference than licensed spectrum, a sidelink device can use a channel access procedure (e.g., LBT) to sense the spectrum before the sidelink device can transmit a reference signal (e.g., PRS, CSI-RS, SRS, etc.) for sidelink positioning. Each sidelink device can transmit its reference signal when the channel access procedure is successful.

In some aspects, sidelink devices (e.g., UE-1, UE-2 UE-N) can use a channel occupancy time (COT) for PRS transmission using shared/unlicensed spectrum. For example, a UE (e.g., initiator) can perform a channel access procedure (e.g., LBT) to access an unlicensed spectrum. If channel access is successful, the UE can initiate a COT for sidelink PRS transmission using the unlicensed spectrum. For example, the channel access procedure may be a type 1 channel access in NR-U. Other UEs (e.g., responders) can share the COT without performing the type 1 channel access procedure. In some aspects, the other UEs, sharing the COT started by the initiating UE, can perform a reduced LBT procedure (e.g., no sensing or no random backoff). For example, the responding UEs can perform a type 2c channel access in NR-U. In some cases, the UE (e.g., initiating UE or responding UE) may fail the channel access procedure (i.e., channel access failure) for PRS transmission. Aspects of the disclosure provide a method for detecting and managing channel access failure in a sidelink positioning session.

Figure 7:
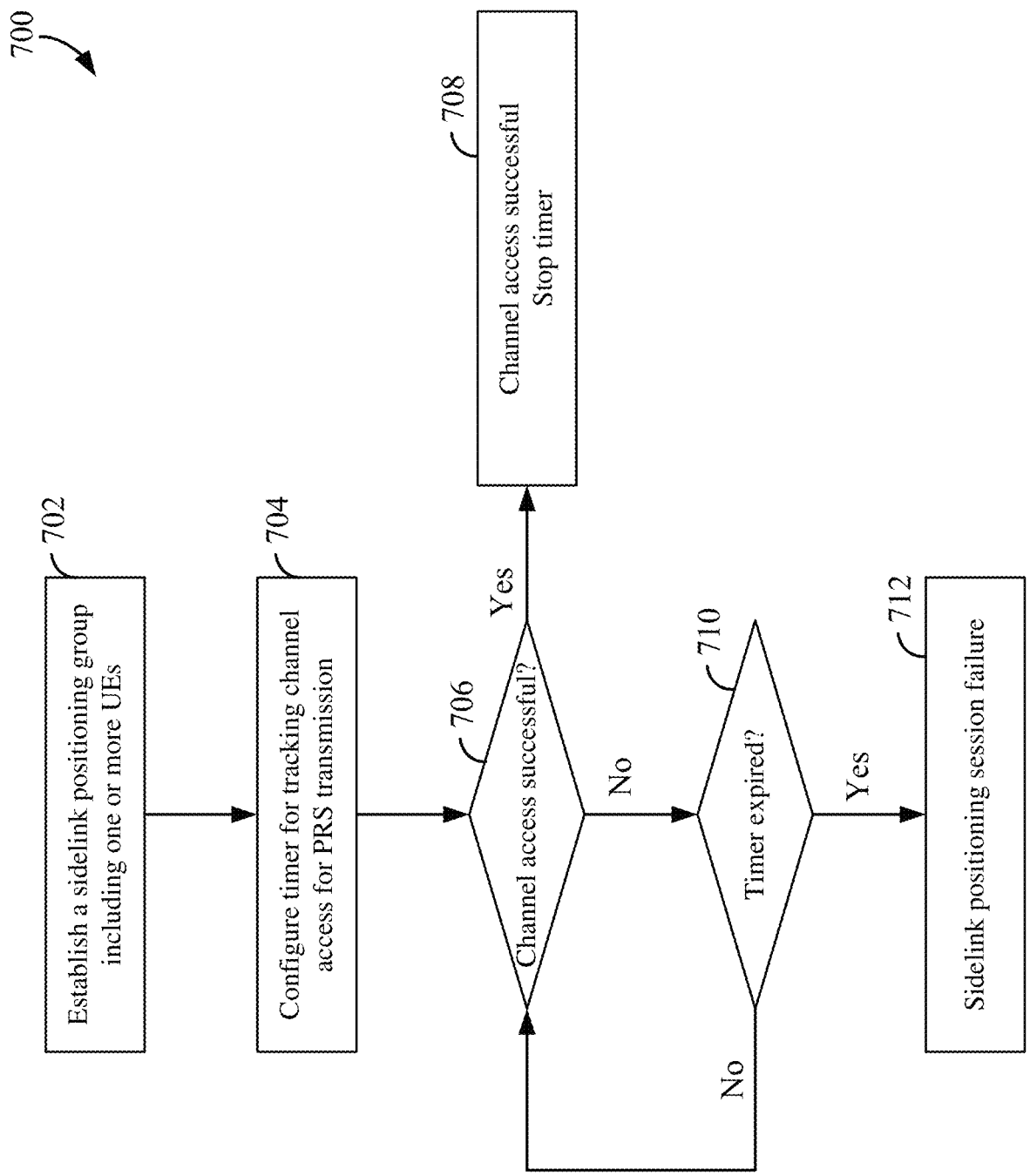
FIG. 7 is a flow chart illustrating an exemplary process for monitoring channel access in a sidelink positioning session according to some aspects of the disclosure

FIG. 7 is a flow chart illustrating an exemplary process 700 for monitoring and managing channel access in a sidelink positioning session according to some aspects of the disclosure. In some examples, the process 700 can be performed by any of the UEs, sidelink (e.g., V2X, D2D, etc.) devices, or other scheduled entities shown in FIGS. 1, 2, 3, and/or 6. For example, the wireless communication devices (e.g., UE 602 and 604a ... 604N) of FIG. 6 can use the process 700 to monitor and manage a channel access procedure (e.g., LBT) for a sidelink positioning session using unlicensed/shared spectrum.

At 702, two or more UEs can establish a sidelink positioning group for a sidelink positioning session. During the positioning session, each UE can transmit one or more PRSs over an unlicensed/shared spectrum. For example, the sidelink positioning group may include the UEs 602 and 604a ... 604N described above in relation to FIG. 6. One UE (e.g., UE-1) may be the initiating UE (initiator), and the other UEs (UE-2 to UE-N) may be the responding UEs (responders). The UEs can use the sidelink handshaking (e.g., sidelink signals 608, 610, 612, and 613 of FIG. 6) to establish the sidelink positioning group. After forming the group, the UEs perform a channel access procedure (LBT) to gain access to the spectrum for transmitting and/or receiving PRSs.

At 704, each UE can configure a timer for tracking a channel access procedure for gaining access to the unlicensed/shared spectrum for PRS transmission. For example, the channel access procedure may be an LBT procedure or the like. In one aspect, the start or initial value (timer value) of the timer can be preconfigured or configured by the network. In one example, the UE can set the timer start value to a preconfigured value when the UE is out-of-coverage of the network (e.g., RAN 200). In some examples, the start value of the timer may be in units of absolute time (e.g., seconds), slots, or symbols. The timer can count down from the start value until it expires (e.g., reaches zero or a predetermined value) or otherwise stops when a predetermined condition is met (i.e., channel access successful). In one example, the network (e.g., gNB, scheduling entity, or base station) can configure the timer start value when the UE is in the coverage of the network.

In one aspect, the UEs can determine the start values of their respective timers when they form a sidelink positioning group. For example, the initiating UE can determine the start value for the timer and indicate the start value to the responding UE during handshaking. For example, the initiating UE can provide the start value in a PRSconfirmation or PRSassistance message. In one aspect, the initiating UE can determine the start value for the timer based on a positioning QoS requirement (e.g., positioning latency, delay budget, positioning priority, etc.), based on a request from responding UEs, or other requirements. The UEs can exchange the QoS requirement during handshaking when establishing the group. In one aspect, the start value of the timer can be implied by one or more sidelink positioning parameters used for the sidelink positioning session. Examples of sidelink positioning parameters include, but are not limited to, positioning delay budget and positioning priority. The UE can use a smaller start value for the timer for a smaller positioning delay budget or a lower positioning priority. A smaller timer start value provides less time for the UE to gain access to the spectrum for PRS transmission.

In one example, the initiating UE can use a LBT procedure with random backoff and a contention window. If the UE senses wireless signal energy below a predetermined threshold (e.g., received signal strength indicator (RSSI) threshold) in the contention window, the UE can access the spectrum to transmit the PRS. In some aspects, the initiating UE can start a COT for the PRS transmission and use sidelink signaling to inform the other UEs of the COT. In some examples, with COT sharing, the other UEs can transmit their respective PRSs without sensing the spectrum or using sensing without backoff. In other examples, if no COT sharing is used, each UE can perform full LBT (i.e., sensing and backoff) to access the spectrum for PRS transmission.

After the timer is configured, the UE can start the timer at a predetermined time (e.g., a reference time or start time) that is the same among the UEs included in the sidelink positioning session. In one aspect, the reference time can be determined during sidelink handshaking when the UEs form the positioning group. In one example, the initiating UE can indicate the reference time in a PRSconfirmation or PRSassistance message. In one example, the initiator UE can indicate a specific time location (e.g., slot or symbol) as the reference time. In one example, the initiator UE can indicate the reference time using an offset value X that indicates a time with respect to a PRSconfirmation or PRSassistance message. In one aspect, the UEs can determine the reference time implicitly. In one example, the reference time can be a predetermined time (e.g., X milliseconds) later than a predetermined message that can confirm, configure, or indicate a sidelink positioning group. For example, the predetermined message may be a PRSconfirmation or PRSassistance message.

At 706, each UE can determine if its channel access procedure is successful. For example, if the UE senses wireless signal energy in the spectrum below a predetermined threshold, the UE can determine that the spectrum is available for PRS transmission and that channel access is successful. On the other hand, if the UE senses wireless signal energy equal to or greater than the predetermined threshold, the spectrum is not available for PRS transmission. In this case, channel access is not successful. The predetermined threshold may be preconfigured (e.g., by the original equipment manufacturer (OEM) and/or various standards or specification) or configured by the network. The UE continues to count down its timer when channel access is not successful.

At 708, if a UE determines that channel access is successful, the UE can stop the timer used for tracking its channel access. In one aspect, an initiating UE can deem its channel access to be successful when the UE in a LBT procedure determines that the spectrum is available for a PRS transmission. If channel access is unsuccessful, the UE can continue or retry channel access before the timer expires. In one aspect, a responding UE can deem its channel access to be successful when the UE can detect the PRS transmitted by the initiating UE; otherwise, the responding UE can continue to monitor for the PRS from the initiating UE until the timer expires. In one aspect, the responding UE can stop its timer for tracking channel access when the responding UE succeeds in its own channel access for transmitting a PRS. In this case, the responding UE may stop its timer after successful channel access only if it has successfully detected the PRS from the initiating UE and transmitted its own PRS.

At 710, each UE can determine if its timer has expired or not. For example, the timer expires when it reaches a predetermined value (e.g., count value of 0). In some examples, the timer can be a count-up timer. If the timer has not expired, the UE can continue the channel access procedure and check for channel access success at 706.

At 712, if the timer has expired, the UE can declare a failure of the channel access of the sidelink positioning session. In one aspect, the initiating UE can declare the failure by transmitting a message (post-PRS message) to the responding UEs. For example, the post-PRS message may be a sidelink message that indicates the failure of positioning transmission. In some aspects, the initiating UE can transmit the post-PRS message or a new message (e.g., restart message) to restart the timers and attempt the channel access procedure again. In some aspects, the start value of the timers can be the same or different from the last channel access attempt. In one aspect, the responding UE can declare a failure of the sidelink positioning session by transmitting a message to the initiating UE when the responding UE failed to receive the PRS transmission from the initiating UE before the timer expires. In some examples, the responding UE can transmit a message to indicate that the responding UE failed its channel access for PRS transmission.

Figure 8:
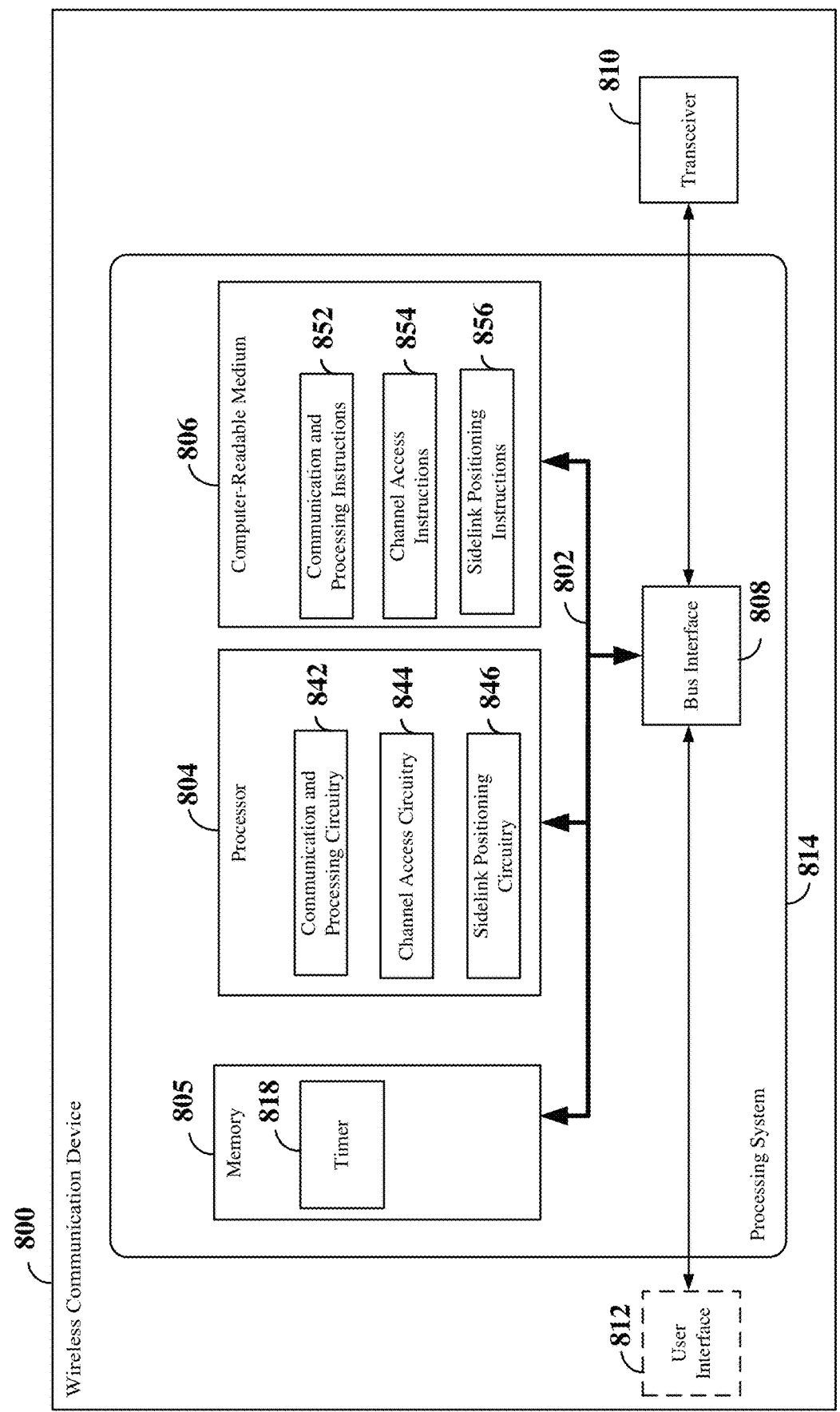
FIG. 8 is a block diagram illustrating an example of a hardware implementation for a wireless apparatus according to some aspects of the disclosure.

FIG. 8 is a block diagram illustrating an example of a hardware implementation for a wireless communication device 800 employing a processing system 814. For example, the wireless communication device 800 may correspond to a sidelink device, such as a V2X device, D2D device or other UE or wireless communication device configured for sidelink or D2D communication, as shown and described above in reference to FIGS. 1-3 and/or 6.

The wireless communication device 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 800 may be configured to perform any one or more of the functions described herein. That is, the processor 804, as utilized in the wireless communication device 800, may be used to implement any one or more of the processes and procedures described below.

The processor 804 may in some instances be implemented via a baseband or modem chip and in other implementations, the processor 804 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 814 may be implemented with a bus architecture, represented generally by the bus 802. The bus 802 may include any number of interconnecting buses and bridges depending on the specific application of the processing system 814 and the overall design constraints. The bus 802 links together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further.

A bus interface 808 provides an interface between the bus 802 and a transceiver 810. The transceiver 810 provides a communication interface or a means for communicating with various other apparatus over a transmission medium (e.g., air interface). Depending upon the nature of the apparatus, a user interface 812 (e.g., keypad, display, touch screen, speaker, microphone, control knobs, etc.) may also be provided. Of course, such a user interface 812 is optional, and may be omitted in some examples.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software. For example, the memory 805 may store a timer 818 used by the processor 804 in sidelink positioning.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806.

The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. In some examples, the computer-readable medium 806 may be part of the memory 805. Those skilled in the art will recognize how best to implement the described functionality presented throughout this disclosure depending on the particular application and the overall design constraints imposed on the overall system.

In some aspects of the disclosure, the processor 804 may include circuitry configured for various functions. For example, the processor 804 may include communication and processing circuitry 842, configured to communicate with one or more sidelink devices (e.g., other UEs) via respective sidelinks (e.g., PC5 interfaces). In addition, the communication and processing circuitry 842 may be configured to communicate with a base station (e.g., gNB or eNB) via a Uu link. In some examples, the communication and processing circuitry 842 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 842 may include one or more transmit/receive chains.

In some implementations where the communication involves receiving information, the communication and processing circuitry 842 may obtain information from a component of the wireless communication device 800 (e.g., from the transceiver 810 that receives the information via radio frequency signaling or some other type of signaling suitable for the applicable communication medium), process (e.g., decode) the information, and output the processed information. For example, the communication and processing circuitry 842 may output the information to another component of the processor 804, to the memory 805, or to the bus interface 808. In some examples, the communication and processing circuitry 842 may receive one or more of signals, messages, other information, or any combination thereof. In some examples, the communication and processing circuitry 842 may receive information via one or more channels. In some examples, the communication and processing circuitry 842 may include functionality for a means for receiving. In some examples, the communication and processing circuitry 842 may include functionality for a means for processing, including a means for demodulating, a means for decoding, etc.

In some implementations where the communication involves sending (e.g., transmitting) information, the communication and processing circuitry 842 may obtain information (e.g., from another component of the processor 804, the memory 805, or the bus interface 808), process (e.g., modulate, encode, etc.) the information, and output the processed information. For example, the communication and processing circuitry 842 may output the information to the transceiver 810 (e.g., that transmits the information via radio frequency signaling or some other type of signaling suitable for the applicable communication medium). In some examples, the communication and processing circuitry 842 may send one or more of signals, messages, other information, or any combination thereof. In some examples, the communication and processing circuitry 842 may send information via one or more channels. In some examples, the communication and processing circuitry 842 may include functionality for a means for sending (e.g., a means for transmitting). In some examples, the communication and processing circuitry 842 may include functionality for a means for generating, including a means for modulating, a means for encoding, etc.

In some examples, the communication and processing circuitry 842 may be configured to transmit a sidelink positioning establishment message to establish a sidelink positioning session (e.g., a sidelink ranging session) or sidelink positioning group with at least a second wireless communication device. The communication and processing circuitry 842 may further be configured to receive a sidelink positioning establishment message from a second wireless communication device to establish a sidelink positioning session or group with at least the second wireless communication device.

In some examples, the communication and processing circuitry 842 may further be configured to communicate one or more sidelink positioning reference signals (PRSs) with at least the second wireless communication device during the sidelink positioning session. For example, the communication and processing circuitry 842 may be configured to transmit PRSs to at least the second wireless communication device and to receive PRSs from at least the second wireless communication device.

In some examples, the communication and processing circuitry 842 may be configured to receive sidelink positioning information (e.g., $PI_{UE-1} \ldots PI_{UE-N}$) based on the one or more PRSs from at least the second wireless communication device. In addition, the communication and processing circuitry 842 may be configured to transmit sidelink positioning information based on the one or more PRSs to at least the second wireless communication device. The communication and processing circuitry 842 may further be configured to execute communication and processing instructions (software) 852 stored in the computer-readable medium 806 to implement one or more of the functions described herein.

The processor 804 may further include channel access circuitry 844, configured to perform processes for accessing spectrum (e.g., unlicensed or shared spectrum) for transmitting or receiving PRSs in a sidelink positioning session. The channel access circuitry 844 may be configured, for example, to gain access to the spectrum using a listen-before-talk (LBT) procedure. In some examples, the channel access circuitry 844 may be configured to use a timer (e.g., timer 818) to monitor and manage the channel access procedure. The channel access circuitry 844 can be configured to set a start value of the timer in coordination with the at least one second wireless communication device. The channel access circuitry 844 can be configured to operate the timer (e.g., count up or count down) to track channel access success or failure in the LBT procedure. The channel access circuitry 844 can be configured to stop the timer when channel access is successful and/or a PRS from the at least one second wireless communication device is detected. The channel access circuitry 844 can be configured to declare failure of the channel access of a sidelink positioning session when the timer expires before the UE can gain access of the spectrum and/or receive a PRS from the at least one second wireless communication device. After the timer expired, the channel access circuitry 844 can be configured to restart the timer and attempts channel access again. The channel access circuitry 844 can be configured to transmit a message (e.g., sidelink message) to the at least one second wireless communication device to declare the failure of the sidelink positioning session.

The processor 804 may further include sidelink positioning circuitry 846, configured to establish a sidelink positioning session, transmit and receive sidelink PRSs during the sidelink positioning session, and to transmit and receive sidelink positioning information based on the PRSs during the sidelink positioning session. For example, the sidelink positioning circuitry 846 may be configured to facilitate a three-way handshake with at least the second wireless communication device to establish the sidelink positioning session. In examples in which the wireless communication device 800 is an initiating device, the sidelink positioning circuitry 846 may be configured to operate together with the channel access circuitry 844 and communication and processing circuitry 842 to generate and transmit the sidelink positioning establishment message to trigger the sidelink positioning session. In examples in which the wireless communication device is a target or responding device, the sidelink positioning circuitry 846 may be configured to operate together with the communication and processing circuitry 842 to receive the sidelink positioning establishment message.

In some examples, the sidelink positioning establishment message indicates a time duration of the sidelink positioning session, and the sidelink positioning circuitry 846 may further be configured to configure (initiate) a timer 818 maintained, for example, in memory 805 with the indicated time duration for monitoring the sidelink positioning session. Upon expiration of the timer 818, the sidelink positioning circuitry 846 may end the sidelink positioning session (e.g., not transmit or receive any additional PRSs and/or sidelink positioning information). The timer 818 may be set on each participating wireless communication device (including the initiating wireless communication device).

In addition, the sidelink positioning circuitry 846 may be configured to calculate the relative position or absolute position (e.g., geographical coordinates) of the wireless communication device 800. In examples in which the wireless communication device 800 has zero or inaccurate knowledge of its position, the positioning information received from other wireless communication devices may be utilized to yield a respective range between the wireless communication device 800 and each other participating wireless communication device. In examples in which wireless communication device 800 has accurate knowledge of its position (e.g., based on a GNSS-based positioning or receipt of multiple sidelink positioning information from multiple participating wireless communication devices), the positioning information received from other wireless communication devices may be utilized to yield an absolute position of the wireless communication device 800. The sidelink positioning circuitry 846 may further be configured to execute sidelink positioning instructions (software) 856 stored in the computer-readable medium 806 to implement one or more of the functions described herein.

Figure 9:
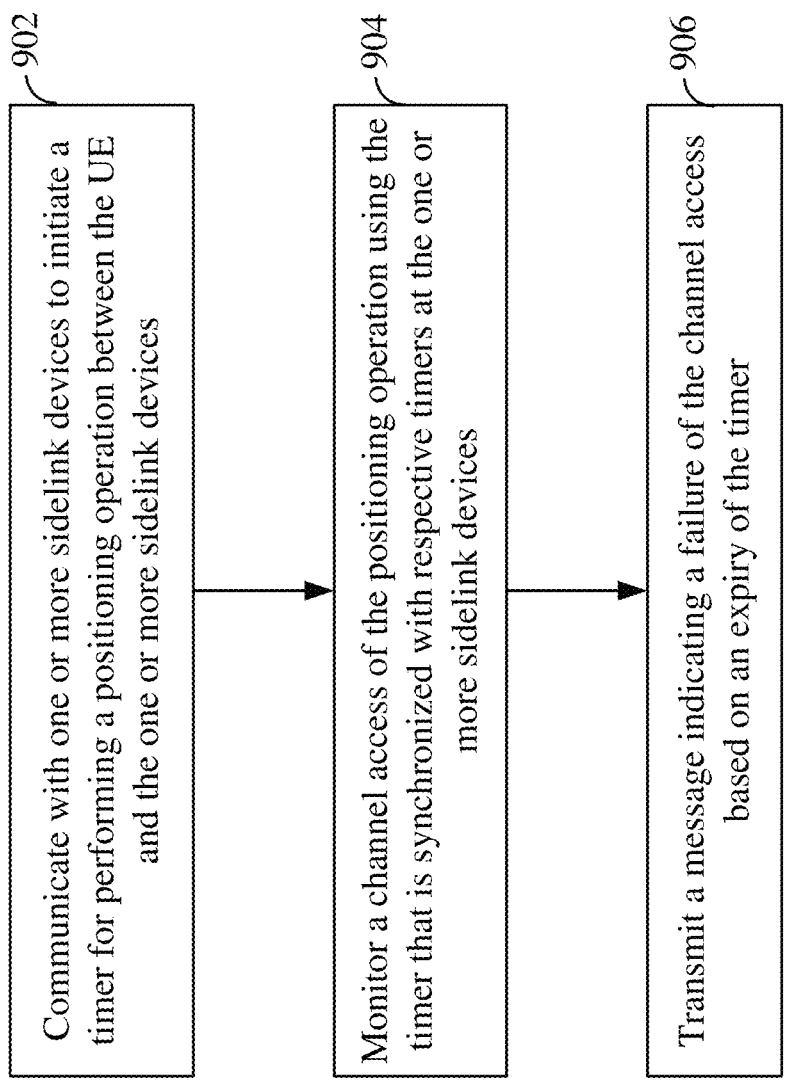
FIG. 9 is a flow chart illustrating an exemplary sidelink positioning process in accordance with some aspects of the present disclosure.

FIG. 9 is a flow chart illustrating an exemplary sidelink positioning process 900 in accordance with some aspects of the present disclosure. As described below, some or all illustrated features may be omitted in a particular implementation within the scope of the present disclosure, and some illustrated features may not be required for all implementations. In some examples, the process 900 may be carried out by the wireless apparatus 800 illustrated in FIG. 8. In some examples, the process 900 may be carried out by any suitable apparatus or means for carrying out the functions or algorithm described below. In some examples, the process 900 may be carried out by any UE, scheduled entity, or V2X device illustrated in FIGS. 1-3 and 6.

At 902, a UE can communicate with one or more sidelink devices (e.g., UEs, V2X devices, or scheduled entities) to initiate a timer for performing a positioning operation between the UE and the one or more sidelink devices. In some aspects, each device can configure a timer to monitor or track the positioning operation. In one aspect, the UE and the one or more sidelink devices may be the UEs (e.g., UE-1, UE-2, UE-3) described in relation to FIG. 6 above. In one aspect, the positioning operation may be the sidelink positioning session described in relation to FIG. 6. For example, the UE can perform handshaking (e.g., signals 608, 610, 612, and 613 in FIG. 6) to initiate a timer (e.g., determine a start value of the timer), for example, in coordination with the one or more sidelink devices. In one aspect, the communication and processing circuitry 842 can provide a means for performing the processes to initiate the timer, for example, to start from a predetermined start value.

At 904, the UE can monitor channel access of the positioning operation using the timer that is synchronized with respective timers at the one or more sidelink devices. In some aspects, each UE can start its respective timer at the same time (e.g., a reference time) or within a time tolerance that is configured or predetermined between the UEs, for example, when the timers are configured. In one aspect, the channel access circuitry 844 can provide a means for monitoring channel access using the timer (e.g., timer 818) to keep track a time interval in which the UE can access the channel. In one example, once the timer has started or initiated, the UE can count down or up the timer from a predetermined start value. The timer can be configured to run for an absolute time interval (e.g., milliseconds), one or more slots, or one or more symbols before timer expires or lapses. In some aspects, while the timer is running, the UE performs a channel access procedure to gain access to a spectrum (e.g., unlicensed or shared spectrum) for transmitting a reference signal (e.g., PRS, CRS-RS, SRS, etc.). For example, the channel access procedure may include a LBT procedure by which the UE can sense the spectrum to determine whether or not the spectrum is available. In one aspect, the channel access circuitry 844 may provide a means to monitor and detect a failure of channel access.

At 906, the UE can transmit a message (e.g., sidelink message) indicating a failure of the channel access based on an expiry of the timer. In one aspect, the communication and processing circuitry 842 may provide a means to transmit the message indicating the failure of channel access. If the UE cannot find available spectrum for transmitting the reference signal (e.g., PRS) before the expiry of the timer, the UE can determine that channel access fails. For example, the timer expires when its value reaches a predetermined value (e.g., a value of 0). In the case that the UE is an initiating UE, the UE can stop the timer when the UE gains access to the spectrum for transmitting the PRS before the timer expires. In the case that the UE is a responding UE, the UE can stop the timer when the UE can detect the PRS from the initiating UE and/or gain access to the spectrum to transmit a PRS. In one aspect, the channel access circuitry 844 can provide a means to operate the timer.

Figure 10:
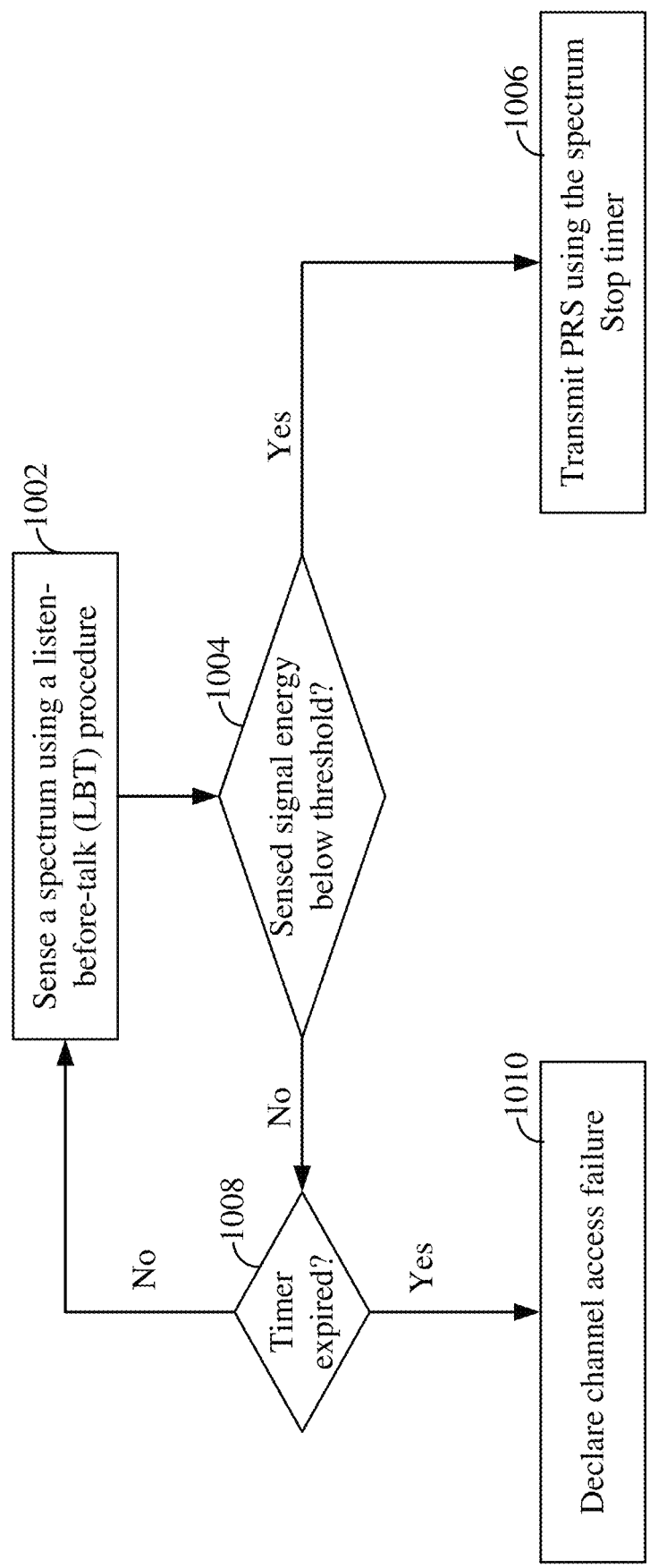
FIG. 10 is a flow chart illustrating an exemplary method for tracking channel access in a sidelink positioning session according to some aspects of the disclosure.

FIG. 10 is a flow chart illustrating an exemplary process 1000 for tracking channel access in a sidelink positioning session according to some aspects of the disclosure. As described below, some or all illustrated features may be omitted in a particular implementation within the scope of the present disclosure, and some illustrated features may not be required for all implementations. In some examples, the process 1000 may be carried out by the wireless apparatus 800 illustrated in FIG. 8. In some examples, the process 1000 may be carried out by any suitable apparatus or means for carrying out the functions or algorithm described below. In some examples, the process 1000 may be carried out by any UE, scheduled entity, V2X device illustrated in FIGS. 1-3 and 6.

At 1002, a UE can sense a spectrum (e.g., unlicensed/shared spectrum) using a LBT procedure. The UE can use the spectrum for transmitting or receiving PRSs, for example, in the sidelink positioning session described in relation to FIG. 6. In one example, the channel access circuitry 844 can provide a means to sense the spectrum using LBT to determine whether or not the spectrum is available for transmitting PRS.

At 1004, the UE determines if the sensed signal energy, if any, in the spectrum is below a threshold (e.g., RSSI threshold). If the signal energy is below the threshold, the UE can determine that the spectrum is available; otherwise, the spectrum is not available for use in the sidelink positioning session. In one example, the channel access circuitry 844 and/or the communication and processing circuitry 842 may provide a means to determine if the signal energy is below the threshold.

At 1006, in case that the signal energy is below the threshold, the UE can transmit its PRS using the spectrum. The UE also can stop the timer after determining that the spectrum is available. At this point, the UE can consider channel access successful. In one example, the sidelink positioning circuitry 846 may provide a means to transmit one or more PRSs. In one example, the channel access circuitry 844 can provide a means to stop the timer.

At 1008, in case that the signal energy is equal to or great than the threshold, the UE checks the timer. If the timer has not expired, the UE can continue to sense the spectrum in order to gain access to the spectrum to transmit its PRS or receive a PRS from another UE. In one example, the channel access circuitry 844 may provide a means to determine if the timer is expired or not.

At 1010, in case that the timer has expired, the UE can declare channel access failure. For example, the UE can transmit a sidelink message to the other UE(s) to indicate channel access failure and end the current sidelink positioning session. In one example, the sidelink positioning circuitry 846 may provide a means to transmit a sidelink message to indicate failure of channel access and/or end the sidelink positioning session. In some examples, the UE can transmit a sidelink message to the other UE(s) to restart the timer to reattempt channel access with the same or a different timer starting value.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1-3 and 6 and utilizing, for example, the processes and/or algorithms described herein in relation to FIGS. 6, 7, 9 and/or 10.

In one configuration, the apparatus 800 for wireless communication includes means for sidelink positioning using a timer as described above. In one aspect, the aforementioned means may be the processor 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1-3 and 6 and utilizing, for example, the processes and/or algorithms described herein in relation to FIGS. 6, 7, 9 and/or 10.

In a first aspect, a user equipment (UE) for wireless communication is provided. The UE comprises a transceiver configured for wireless communication, a memory, and a processor operatively coupled to the memory and the transceiver. The processor and the memory are configured to: communicate with one or more sidelink devices to initiate a timer for performing a positioning operation between the UE and the one or more sidelink devices; monitor channel access of the positioning operation using the timer that is synchronized with respective timers at the one or more sidelink devices; and transmit a message indicating a failure of the channel access based on an expiry of the timer.

In a second aspect, alone or in combination with the first aspect, wherein the processor and the memory are further configured to, at least one of: determine a start value of the timer in coordination with the one or more sidelink devices; determine the start value of the timer based on a preconfigured value when the UE is out-of-coverage of a network; or determine the start value of the timer based on a value configured by the network when the UE is in-coverage of the network.

In a third aspect, alone or in combination with the first aspect, wherein the processor and the memory are further configured to determine a start value of the timer based on, at least one of: one or more positioning parameters; a timer value received from the one or more sidelink devices; a timer value autonomously determined by the UE.

In a fourth aspect, alone or in combination with any of the first to third aspects, wherein the processor and the memory are further configured to communicate with the one or more sidelink devices to determine a start time of the timer.

In a fifth aspect, alone or in combination with the fourth aspect, wherein the processor and the memory are further configured to transmit or receive a positioning assistance message, and determine the start time of the timer based on the positioning assistance message.

In a sixth aspect, alone or in combination with any of the first to fifth aspects, wherein the processor and the memory are further configured to stop the timer in response to determining that the channel access is successful.

In a seventh aspect, alone or in combination with any of the first to sixth aspects, wherein the processor and the memory are further configured to receive a positioning reference signal from the one or more sidelink devices, and stop the timer in response to at least one of receiving the positioning reference signal or determining that the channel access is successful.

In an eighth aspect, alone or in combination with any of the first to seventh aspects, wherein the processor and the memory are further configured to restart, in coordination with the one or more sidelink devices, the timer for the channel access.

In a ninth aspect, a method of wireless communication at a UE is provided. The method comprises: communicating with one or more sidelink devices to initiate a timer for performing a positioning operation between the UE and the one or more sidelink devices; monitoring channel access of the positioning operation using the timer that is synchronized with respective timers at the one or more sidelink devices; and transmitting a message indicating a failure of the channel access based on an expiry of the timer.

In a tenth aspect, alone or in combination with the ninth aspect, the method further comprises, at least one of: determining a start value of the timer in coordination with the one or more sidelink devices; determining the start value of the timer based on a preconfigured value when the UE is out-of-coverage of a network; or determining the start value of the timer based on a value configured by the network when the UE is in-coverage of the network.

In an eleventh aspect, alone or in combination with the ninth aspect, the method further comprises determining a start value of the timer based on, at least one of: one or more positioning parameters; a timer value received from the one or more sidelink devices; a timer value autonomously determined by the UE.

In a twelfth aspect, alone or in combination with any of the ninth to tenth aspects, the method further comprises communicating with the one or more sidelink devices to determine a start time of the timer.

In a thirteenth aspect, alone or in combination with the twelfth aspect, the method further comprises: transmitting or receiving a positioning assistance message; and determining the start time of the timer based on the positioning assistance message.

In a fourteen aspect, alone or in combination with any of the ninth to thirteen aspects, the method further comprises stopping the timer in response to determining that the channel access is successful.

In a fifteenth aspect, alone or in combination with any of the ninth to thirteen aspects, the method further comprises: receiving a positioning reference signal from the one or more sidelink devices; and stopping the timer in response to at least one of: receiving the positioning reference signal; or determining that the channel access is successful.

In a sixteenth aspect, alone or in combination with any of the ninth to fifteenth aspects, the method further comprises: restarting, in coordination with the one or more sidelink devices, the timer for the channel access.

In a seventeenth aspect, a user equipment (UE) for wireless communication is provided. The UE comprises: means for communicating with one or more sidelink devices to initiate a timer for performing a positioning operation between the UE and the one or more sidelink devices; means for monitoring channel access of the positioning operation using the timer that is synchronized with respective timers at the one or more sidelink devices; and means for transmitting a message indicating a failure of the channel access based on an expiry of the timer.

In an eighteenth aspect, alone or in combination with the seventeenth aspect, the UE further comprises, at least one of: means for determining a start value of the timer in coordination with the one or more sidelink devices; means for determining the start value of the timer based on a preconfigured value when the UE is out-of-coverage of a network; or means for determining the start value of the timer based on a value configured by the network when the UE is in-coverage of the network.

In a nineteenth aspect, alone or in combination with the seventeenth aspect, the UE further comprises means for determining a start value of the timer based on, at least one of: one or more positioning parameters; a timer value received from the one or more sidelink devices; a timer value autonomously determined by the UE.

In a twentieth aspect, alone or in combination with any of the seventeenth to nineteenth aspects, the UE further comprises means for communicating with the one or more sidelink devices to determine a start time of the timer.

In a twenty-first aspect, alone or in combination with the twentieth aspect, the UE further comprises: means for transmitting or receiving a positioning assistance message; and means for determining the start time of the timer based on the positioning assistance message.

In a twenty-second aspect, alone or in combination with any of the seventeenth to twenty-first aspects, the UE further comprises means for stopping the timer in response to determining that the channel access is successful.

In a twenty-third aspect, alone or in combination with any of the seventeenth to twenty-first aspects, the UE further comprises: means for receiving a positioning reference signal from the one or more sidelink devices; and means for stopping the timer in response to at least one of: receiving the positioning reference signal; or determining that the channel access is successful.

In a twenty-fourth aspect, a computer-readable storage medium stored with executable code for wireless communication is provided. The executable code comprises instructions for causing a UE to: communicate with one or more sidelink devices to initiate a timer for performing a positioning operation between the UE and the one or more sidelink devices; monitor channel access of the positioning operation using the timer that is synchronized with respective timers at the one or more sidelink devices; and transmit a message indicating a failure of the channel access based on an expiry of the timer.

In a twenty-fifth aspect, alone or in combination with the twenty-four aspect, wherein the instructions further cause the UE to, at least one of: determine a start value of the timer in coordination with the one or more sidelink devices; determine the start value of the timer based on a preconfigured value when the UE is out-of-coverage of a network; or determine the start value of the timer based on a value configured by the network when the UE is in-coverage of the network.

In a twenty-sixth aspect, alone or in combination with the twenty-four aspect, wherein the instructions further cause the UE to determine a start value of the timer based on, at least one of: one or more positioning parameters; a timer value received from the one or more sidelink devices; a timer value autonomously determined by the UE.

In a twenty-seventh aspect, alone or in combination with any of the twenty-four to twenty-sixth aspects, wherein the instructions further cause the UE to communicate with the one or more sidelink devices to determine a start time of the timer.

In a twenty-eighth aspect, alone or in combination with the twenty-seventh aspect, wherein the instructions further cause the UE to: transmit or receiving a positioning assistance message; and determine the start time of the timer based on the positioning assistance message.

In a twenty-ninth aspect, alone or in combination with any of the twenty-fourth to twenty-eighth aspects, wherein the instructions further cause the UE to stop the timer in response to determining that the channel access is successful.

In a thirtieth aspect, alone or in combination with any of the twenty-fourth to twenty-eighth aspects, wherein the instructions further cause the UE to: receive a positioning reference signal from the one or more sidelink devices; and stop the timer in response to at least one of: receiving the positioning reference signal; or determining that the channel access is successful.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A user equipment (UE) for wireless communication, comprising:
   a transceiver configured for wireless communication;
   a memory; and
   a processor operatively coupled to the memory and the transceiver,
   wherein the processor and the memory are configured to:
      communicate with one or more sidelink devices to initiate a timer for performing a positioning operation between the UE and the one or more sidelink devices;
      monitor channel access of the positioning operation using the timer that is synchronized with respective timers at the one or more sidelink devices; and
      transmit a message indicating a failure of the channel access based on an expiry of the timer.

2. The UE of claim 1, wherein the processor and the memory are further configured to, at least one of:
   determine a start value of the timer in coordination with the one or more sidelink devices;
   determine the start value of the timer based on a preconfigured value when the UE is out-of-coverage of a network; or
   determine the start value of the timer based on a value configured by the network when the UE is in-coverage of the network.

3. The UE of claim 1, wherein the processor and the memory are further configured to determine a start value of the timer based on, at least one of:
   one or more positioning parameters;
   a timer value received from the one or more sidelink devices;
   a timer value autonomously determined by the UE.

4. The UE of claim 1, wherein the processor and the memory are further configured to:
   communicate with the one or more sidelink devices to determine a start time of the timer.

5. The UE of claim 4, wherein the processor and the memory are further configured to:
   transmit or receive a positioning assistance message; and
   determine the start time of the timer based on the positioning assistance message.

6. The UE of claim 1, wherein the processor and the memory are further configured to:
   stop the timer in response to determining that the channel access is successful.

7. The UE of claim 1, wherein the processor and the memory are further configured to:
   receive a positioning reference signal from the one or more sidelink devices; and
   stop the timer in response to at least one of:
      receiving the positioning reference signal; or
      determining that the channel access is successful.

8. The UE of claim 1, wherein the processor and the memory are further configured to:
   restart, in coordination with the one or more sidelink devices, the timer for the channel access.

9. A method of wireless communication at a user equipment (UE), the method comprising:
   communicating with one or more sidelink devices to initiate a timer for performing a positioning operation between the UE and the one or more sidelink devices;
   monitoring channel access of the positioning operation using the timer that is synchronized with respective timers at the one or more sidelink devices; and
   transmitting a message indicating a failure of the channel access based on an expiry of the timer.

10. The method of claim 9, further comprising, at least one of:
    determining a start value of the timer in coordination with the one or more sidelink devices;
    determining the start value of the timer based on a preconfigured value when the UE is out-of-coverage of a network; or
    determining the start value of the timer based on a value configured by the network when the UE is in-coverage of the network.

11. The method of claim 9, further comprising determining a start value of the timer based on, at least one of:
    one or more positioning parameters;
    a timer value received from the one or more sidelink devices;
    a timer value autonomously determined by the UE.

12. The method of claim 9, further comprising:
    communicating with the one or more sidelink devices to determine a start time of the timer.

13. The method of claim 12, further comprising:
    transmitting or receiving a positioning assistance message; and
    determining the start time of the timer based on the positioning assistance message.

14. The method of claim 9, further comprising:
    stopping the timer in response to determining that the channel access is successful.

15. The method of claim 9, further comprising:
    receiving a positioning reference signal from the one or more sidelink devices; and
    stopping the timer in response to at least one of:
       receiving the positioning reference signal; or
       determining that the channel access is successful.

16. The method of claim 9, further comprising:
    restarting, in coordination with the one or more sidelink devices, the timer for the channel access.

17. A user equipment (UE) for wireless communication comprising:
    means for communicating with one or more sidelink devices to initiate a timer for performing a positioning operation between the UE and the one or more sidelink devices;
    means for monitoring channel access of the positioning operation using the timer that is synchronized with respective timers at the one or more sidelink devices; and
    means for transmitting a message indicating a failure of the channel access based on an expiry of the timer.

18. The UE of claim 17, further comprising, at least one of:
    means for determining a start value of the timer in coordination with the one or more sidelink devices;
    means for determining the start value of the timer based on a preconfigured value when the UE is out-of-coverage of a network; or
    means for determining the start value of the timer based on a value configured by the network when the UE is in-coverage of the network.

19. The UE of claim 17, further comprising means for determining a start value of the timer based on, at least one of:
    one or more positioning parameters;
    a timer value received from the one or more sidelink devices;
    a timer value autonomously determined by the UE.

20. The UE of claim 17, further comprising:
    means for communicating with the one or more sidelink devices to determine a start time of the timer.

21. The UE of claim 20, further comprising:
    means for transmitting or receiving a positioning assistance message; and
    means for determining the start time of the timer based on the positioning assistance message.

22. The UE of claim 17, further comprising:
    means for stopping the timer in response to determining that the channel access is successful.

23. The UE of claim 17, further comprising:
    means for receiving a positioning reference signal from the one or more sidelink devices; and
    means for stopping the timer in response to at least one of:
       receiving the positioning reference signal; or
       determining that the channel access is successful.

24. A non-transitory computer-readable storage medium stored with executable code for wireless communication, the executable code comprising instructions for causing a user equipment (UE) to:
- communicate with one or more sidelink devices to initiate a timer for performing a positioning operation between the UE and the one or more sidelink devices;
- monitor channel access of the positioning operation using the timer that is synchronized with respective timers at the one or more sidelink devices; and
- transmit a message indicating a failure of the channel access based on an expiry of the timer.

25. The non-transitory computer-readable storage medium of claim 24, wherein the instructions further cause the UE to, at least one of:
- determine a start value of the timer in coordination with the one or more sidelink devices;
- determine the start value of the timer based on a preconfigured value when the UE is out-of-coverage of a network; or
- determine the start value of the timer based on a value configured by the network when the UE is in-coverage of the network.

26. The non-transitory computer-readable storage medium of claim 24, wherein the instructions further cause the UE to determine a start value of the timer based on, at least one of:
- one or more positioning parameters;
- a timer value received from the one or more sidelink devices;
- a timer value autonomously determined by the UE.

27. The non-transitory computer-readable storage medium of claim 24, wherein the instructions further cause the UE to:
- communicate with the one or more sidelink devices to determine a start time of the timer.

28. The non-transitory computer-readable storage medium of claim 27, wherein the instructions further cause the UE to:
- transmit or receiving a positioning assistance message; and
- determine the start time of the timer based on the positioning assistance message.

29. The non-transitory computer-readable storage medium of claim 24, wherein the instructions further cause the UE to:
- stop the timer in response to determining that the channel access is successful.

30. The non-transitory computer-readable storage medium of claim 24, wherein the instructions further cause the UE to:
- receive a positioning reference signal from the one or more sidelink devices; and
- stop the timer in response to at least one of:
  - receiving the positioning reference signal; or
  - determining that the channel access is successful.

* * * * *